(12) United States Patent
Higashijima et al.

(10) Patent No.: US 8,409,482 B2
(45) Date of Patent: Apr. 2, 2013

(54) POROUS MEMBER

(75) Inventors: Jiro Higashijima, Koshi (JP); Satoshi Kaneko, Koshi (JP)

(73) Assignee: Tokyo Electron Limited, Minato-Ku (JP)

( * ) Notice: Subject to any disclaimer, the term of this patent is extended or adjusted under 35 U.S.C. 154(b) by 271 days.

(21) Appl. No.: 12/677,182

(22) PCT Filed: Feb. 23, 2009

(86) PCT No.: PCT/JP2009/053189
§ 371 (c)(1),
(2), (4) Date: Apr. 1, 2010

(87) PCT Pub. No.: WO2009/110342
PCT Pub. Date: Sep. 11, 2009

(65) Prior Publication Data
US 2011/0011793 A1   Jan. 20, 2011

(30) Foreign Application Priority Data
Mar. 4, 2008   (JP) ................................. 2008-053530

(51) Int. Cl.
*B29C 65/00* (2006.01)
*B29C 67/20* (2006.01)
*B01D 39/00* (2006.01)

(52) U.S. Cl. .......... 264/41; 264/49; 210/500.36

(58) Field of Classification Search ............. 210/500.36, 210/500.27; 264/41, 48–49, 127; 428/319.3, 428/319.9
See application file for complete search history.

(56) References Cited

U.S. PATENT DOCUMENTS

| 4,927,576 | A | * | 5/1990 | Seita et al. ..................... 264/49 |
| 5,286,324 | A | * | 2/1994 | Kawai et al. ................... 156/155 |
| 5,700,375 | A | * | 12/1997 | Hagen et al. ................... 210/651 |
| 7,374,679 | B2 | * | 5/2008 | Huang et al. ............. 210/500.36 |
| 7,378,020 | B2 | * | 5/2008 | Ieraci et al. ............. 210/500.36 |
| 7,611,629 | B2 | * | 11/2009 | Doucoure et al. ....... 210/500.36 |
| 2006/0032813 | A1 | * | 2/2006 | Ieraci et al. ............. 210/500.36 |
| 2008/0203012 | A1 | * | 8/2008 | Yeager et al. ............ 210/500.36 |
| 2008/0311358 | A1 | | 12/2008 | Tomii et al. |
| 2009/0008142 | A1 | | 1/2009 | Shimizu et al. |

FOREIGN PATENT DOCUMENTS

| JP | 61-291634 A1 | 12/1986 |
| JP | 63-020339 A1 | 1/1988 |
| JP | 02-160924 A1 | 6/1990 |
| JP | 04-279639 A1 | 10/1992 |
| JP | 2003-041083 A1 | 2/2003 |
| JP | 2007-157965 A1 | 6/2007 |
| TW | 200740308 A1 | 10/2007 |
| TW | 200800609 A1 | 1/2008 |

OTHER PUBLICATIONS

Taiwanese Office Action dated Jul. 27, 2012.

* cited by examiner

*Primary Examiner* — Ana Fortuna
(74) *Attorney, Agent, or Firm* — Burr & Brown

(57) ABSTRACT

According to one embodiment of the present invention, there is provided a porous member formed by providing a member formed of a fluororesin containing carbon fiber and having a predetermined shape and exposing the member to an oxidizing gas to remove the carbon fiber contained in the member.

5 Claims, 5 Drawing Sheets

POROUS MEMBER

FIELD OF THE INVENTION

The present invention relates to a porous member.

BACKGROUND ART

Conventionally, filters such as an air filter, filtration filter and the like have been used widely in semiconductor manufacturing industry and other industries. In recent years, filters composed of polytetrafluoroethylene (PTFE) porous membrane with extremely low pressure loss and extremely high trapping efficiency have attracted attention.

The filters composed of PTFE porous membrane can be produced, for example, by the following method. First, a sheet-like molded body of un-sintered or semi-sintered PTFE is formed and then the resultant sheet-like molded body is stretched to form cracks, thereby forming pores in the sheet-like molded body to produce the filter.

However, since the pores are formed in the sheet-like molded body by forming cracks in the sheet-like molded body, it is difficult to control the pore diameter. Note that Japanese Patent Laid-Open Publication No. 2003-41083 discloses a technique to have PTFE contain carbon fiber.

SUMMARY OF THE INVENTION

The present invention has been made to overcome the above-mentioned problem. That is, an object is to provide a porous member with improved uniformity of the pore diameter and a method for manufacturing the same. Furthermore, an object is to provide a filter which allows improvement of the uniformity of the process.

According to one embodiment of the present invention, there is provided a porous member formed by providing a member formed of a fluororesin containing carbon fiber and having a predetermined shape and exposing the member to an oxidizing gas to remove the carbon fiber contained in the member.

According to another embodiment of the present invention, there is provided a method for manufacturing a porous member comprising providing a member formed of a fluororesin containing a carbon material and having a predetermined shape and exposing the member to an oxidizing gas to remove the carbon fiber contained in the member.

According to another embodiment of the present invention, there is provided a filter comprising the porous member of the above-mentioned present invention.

According to the method for manufacturing the porous member of one embodiment of the present invention and the porous member of another embodiment of the present invention, since the porous member is formed by exposing the member made of the fluororesin containing carbon fiber to an oxidizing gas to remove the carbon fiber contained in the member, the diameter of the carbon fiber is equal to the diameter of the pores of the porous member. Accordingly, the porous member with improved uniformity of the pore diameter can be provided.

According to the filter of another embodiment of the present invention, since the filter is constructed with a porous member with improved uniformity of the pore diameter, uniformity of the process using the filter can be improved.

DETAILED DESCRIPTION OF THE INVENTION

Figure 1A:
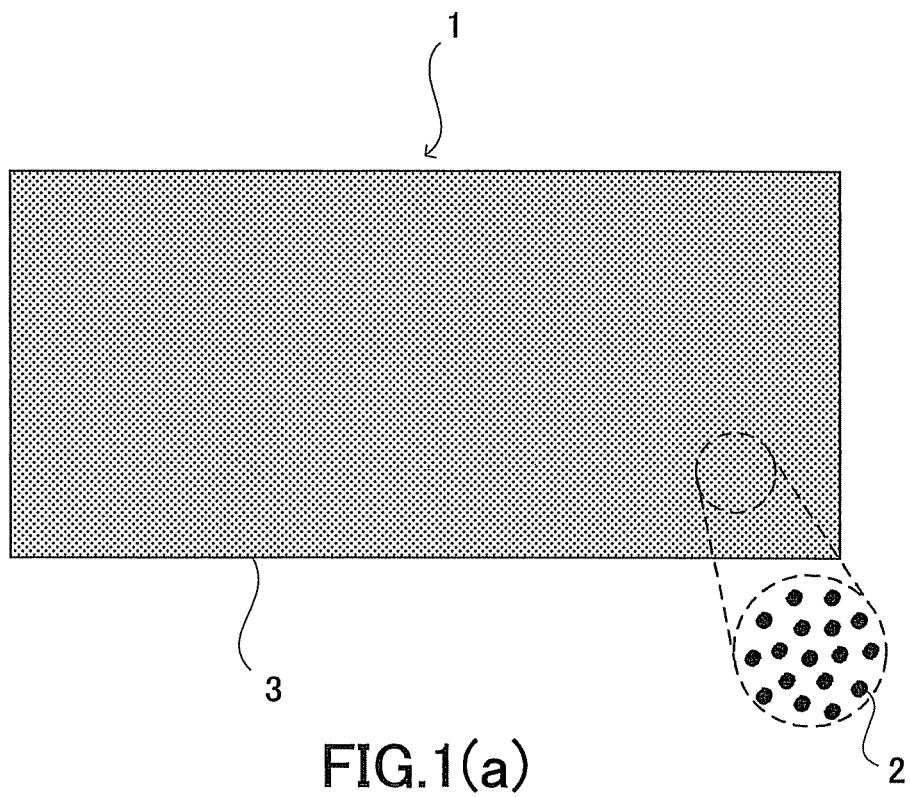
FIG. 1(a) and FIG. 1(b) are a plan view and a vertical sectional view of the member relating to the embodiment.
Figure 1B:
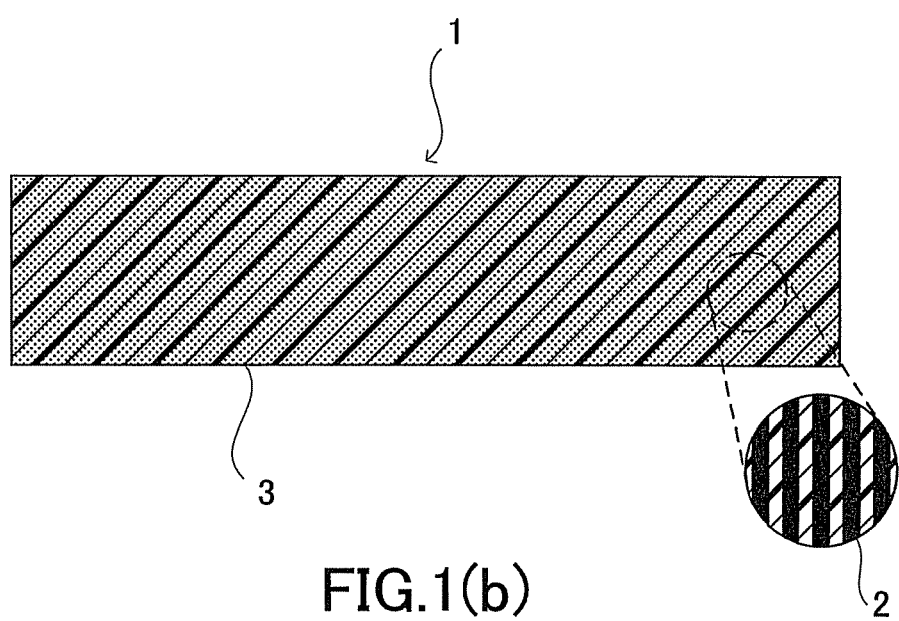
Figure 2A:
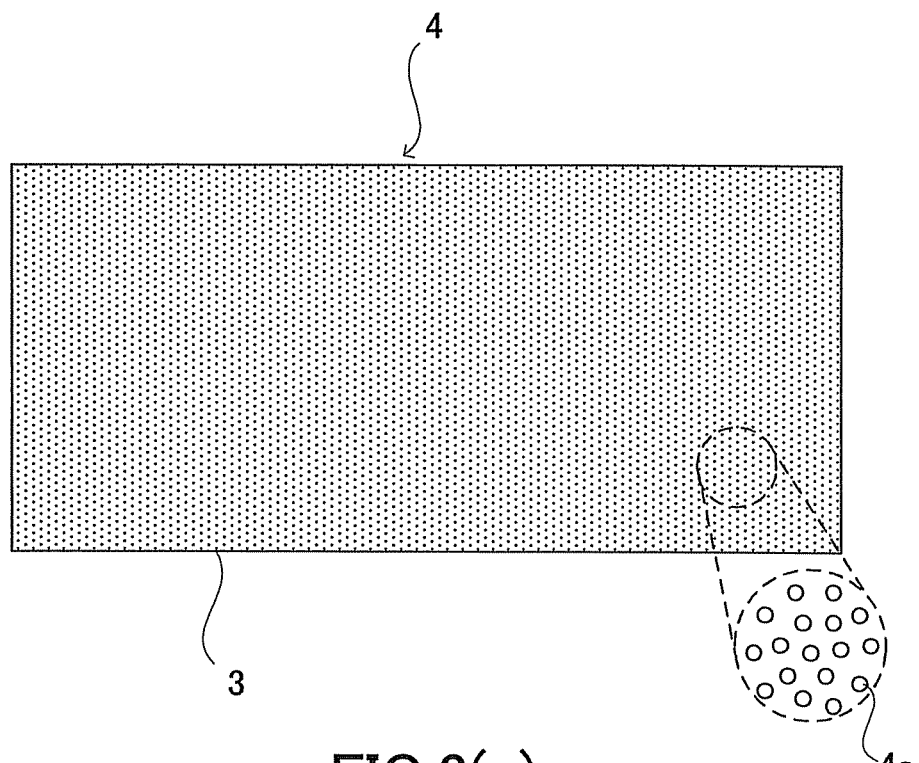
FIG. 2(a) and FIG. 2(b) are a plan view and a vertical sectional view of the porous member relating to the embodiment.
Figure 2B:
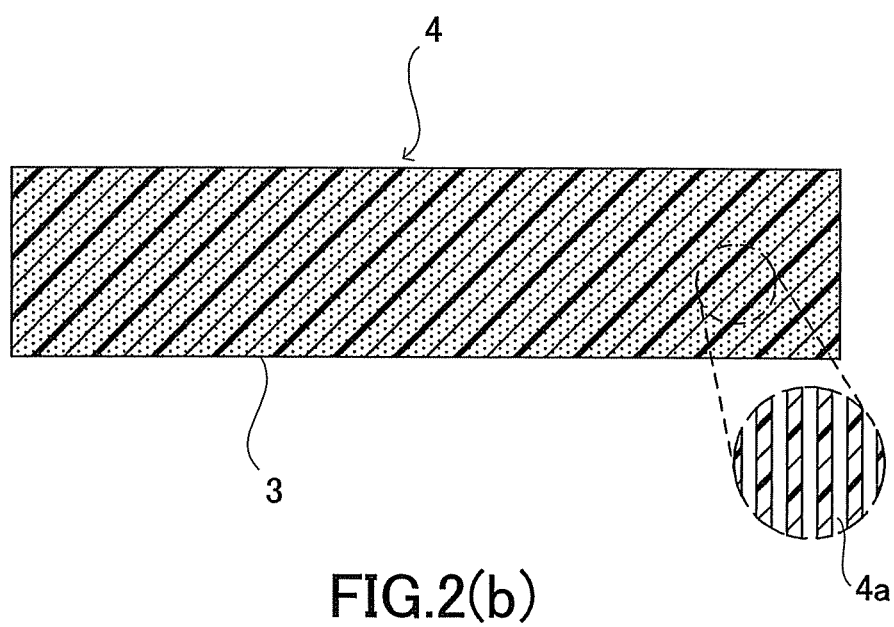

Hereinafter, the embodiments of the present invention will be described in reference to the drawings. FIG. 1(a) and FIG. 1(b) are a plan view and a vertical sectional view of the member relating to the embodiment and FIG. 2(a) and FIG. 2(b) are a plan view and a vertical sectional view of the porous member relating to the embodiment.

As shown in FIG. 1(a) and FIG. 1(b), a pretreatment member 1 having a predetermined shape and containing carbon fiber 2 not removed, which will be described later, is provided. The member 1 is constructed from a fluororesin 3 containing the carbon fiber 2. The carbon fiber 2 is contained in the fluororesin 3 nearly uniformly and, in this embodiment, the carbon fiber 2 is arranged so that the longitudinal direction of the carbon fiber 2 is along the thickness direction of the member 1.

As the fluororesin 3, for example, tetrafluoroethylene/perfluoroalkylvinylether copolymer (PFA), polytetrafluoroethylene (PTFE), tetrafluoroethylene/hexafluoropropylene copolymer (FEP), tetrafluoroethylene/hexafluoropropylene/perfluoroalkylvinylether copolymer (EPE), or tetrafluoroethylene/ethylene copolymer (ETFE) and the like are exemplified.

Such member 1 can be made by various methods. Specifically for example, if the fluororesin 3 is PFA, the member 1 composed of PFA containing the carbon fiber 2 can be made by an injection molding of the PFA material mixed with the carbon fiber 2. In addition, if the fluororesin is PTFE, the member 1 composed of PTFE containing the carbon fiber 2 can be made by sintering the PTFE powder mixed with the carbon fiber 2.

The member 1 is then exposed to an oxidizing gas containing ozone and water vapor. Accordingly, the carbon fiber 2 is oxidized by ozone and water vapor and removed from the fluororesin 3 as carbon dioxide, thus the carbon fiber 2 is removed from the fluororesin 3. In addition, the oxidizing gas may be composed of ozone only.

Here, although C—C bonds in the carbon fiber 2 are cleaved by oxidation with ozone and water vapor, the C—C bonds or C—F bonds in the fluororesin 3 are not cleaved by the oxidizing power of ozone. Therefore, it is believed that only the carbon fiber 2 is removed even by exposing the fluororesin 3 to ozone and water vapor and the composition of the fluororesin 3 is not affected at all.

This removal of the carbon fiber 2 is preferably carried out so that the carbon fiber 2 is substantially removed. That is, since the removal of the carbon fiber 2 depends on the time of exposure to the oxidizing gas, the depth of removal of the carbon fiber 2 can be controlled by controlling the time of the exposure. Therefore, the carbon fiber 2 present in the member 1 can be substantially removed by controlling the time of exposure to the oxidizing gas.

In addition, the above-mentioned "substantially" means not only that the carbon fiber 2 present in the member 1 is completely removed but also includes the case where a small amount of the carbon fiber 2 remains in the member 1. In addition, if the carbon fiber 2 itself has a harmful effect when, for example, the porous member 4 is used as a filter, it is preferable that the carbon fiber 2 present in the member 1 is completely removed.

Accordingly, the porous member 4 shown in FIG. 2(a) and FIG. 2(b) is made. Upon removal of the carbon fiber 2, since a pore 4a is formed at the location where the carbon fiber 2 was present, the porous member 4 becomes porous. In addition, since the carbon fiber 2 is arranged so that the longitudinal direction of the carbon fiber 2 is along the thickness direction of the member 1, the pore 4a formed by removal of the carbon fiber 2 is formed along the thickness direction of the porous member 4.

According to this embodiment, since the porous member 4 is formed by exposing the member 1 made of the fluororesin 3 containing the carbon fiber 2 to the oxidizing gas to remove the carbon fiber 1 contained in the member 3, the diameter of the carbon fiber 1 is equal to the diameter of the pore 4a of the porous member 4. Accordingly, the porous member 4 with improved uniformity of the pore diameter can be provided.

In addition, when the porous member 4 is used as a filter, since the uniformity of the pore diameter of the pore 4a is improved, it is possible to improve the uniformity of the process using the filter. In addition, since the pore 4a is formed in the thickness direction of the porous member 4, a fluid flown to the filter is flown from the thickness direction of the porous member 4.

According to this embodiment, since ozone and water vapor are used as the oxidizing gas, the removal rate of the carbon fiber 2 can be increased compared to using ozone alone. That is, although only the oxygen radicals come into action when ozone is used alone, the hydroxyl radicals that have a strong oxidizing power come into action besides the oxygen radicals when ozone and water vapor are used. Accordingly, the removal rate of the carbon fiber 2 can be increased.

Note that the present invention is not limited to the above-described contents of the embodiments, and the structures, materials, arrangements of respective members, and the like may suitably be changed as long as they do not deviate from the gist of the present invention. Although the above-mentioned embodiments describe the case where the porous member 4 is used as a filter, the application of the porous member 4 is not limited to the filter.

EXAMPLE

Figure 3:
FIG. 3 is a photograph of a sample before the experiment relating to the example.
Figure 4:
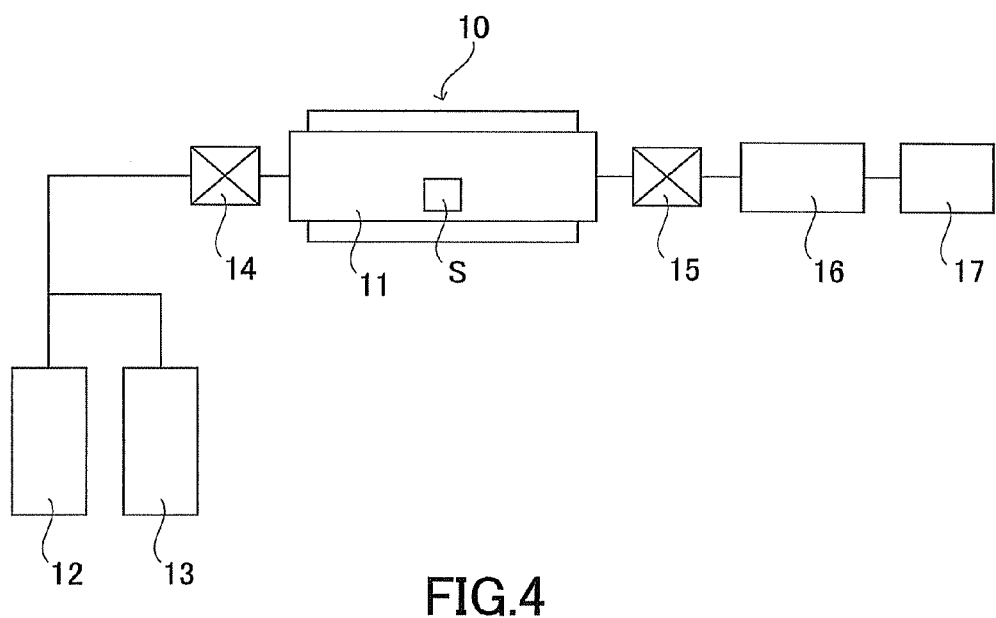
FIG. 4 is a schematic block diagram of the experimental apparatus for treating a sample relating to the example.
Figure 5:
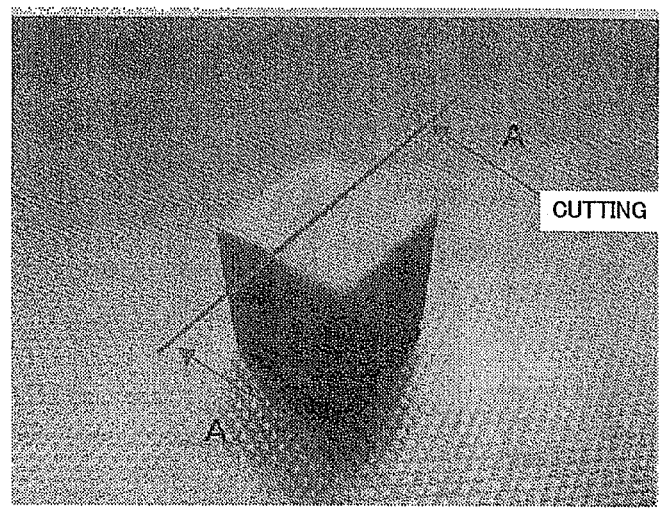
FIG. 5 is a photograph of a sample after the experiment relating to the example.
Figure 6:
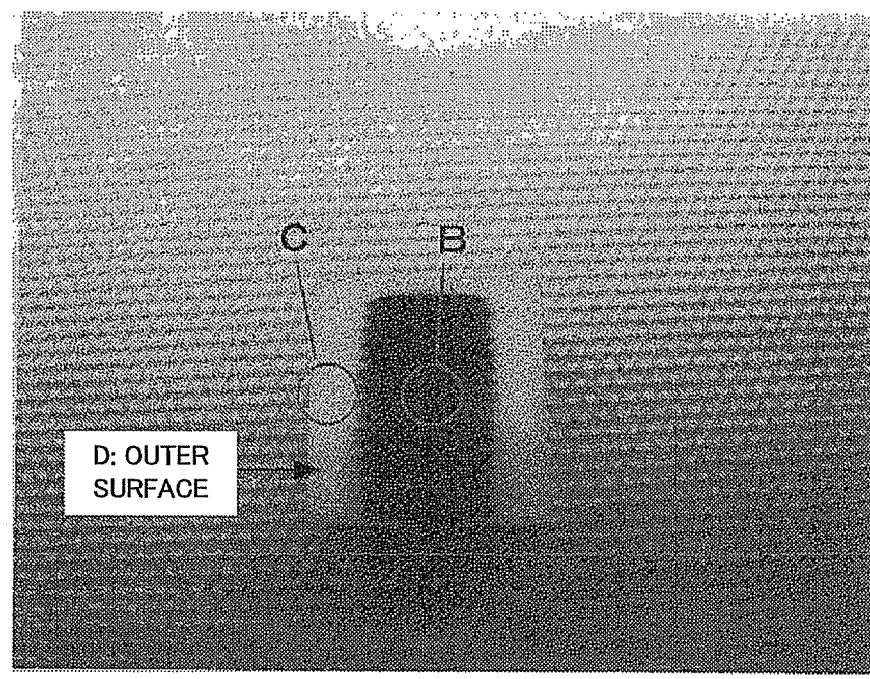
FIG. 6 is a cross sectional photograph taken along the line A-A of FIG. 5.
Figure 7:
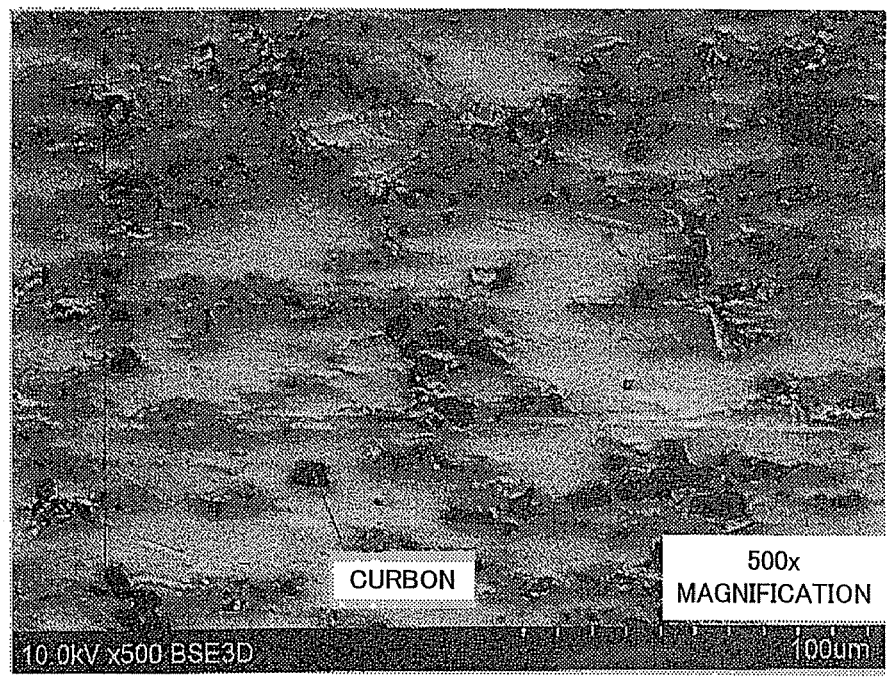
FIG. 7 is an enlarged microscopic photograph of section B of FIG. 6.
Figure 8:
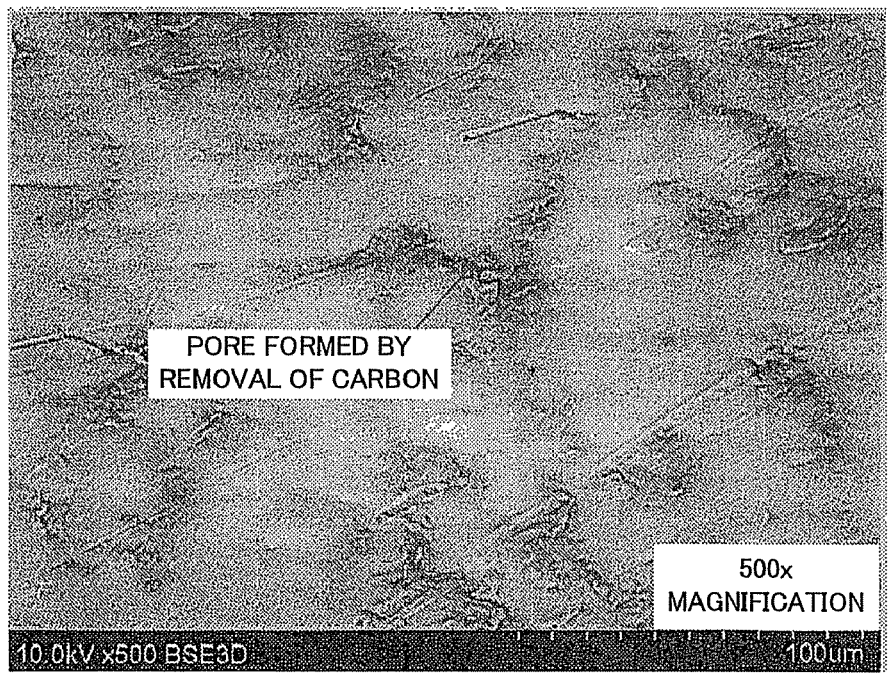
FIG. 8 is an enlarged microscopic photograph of section C of FIG. 6.
Figure 9:
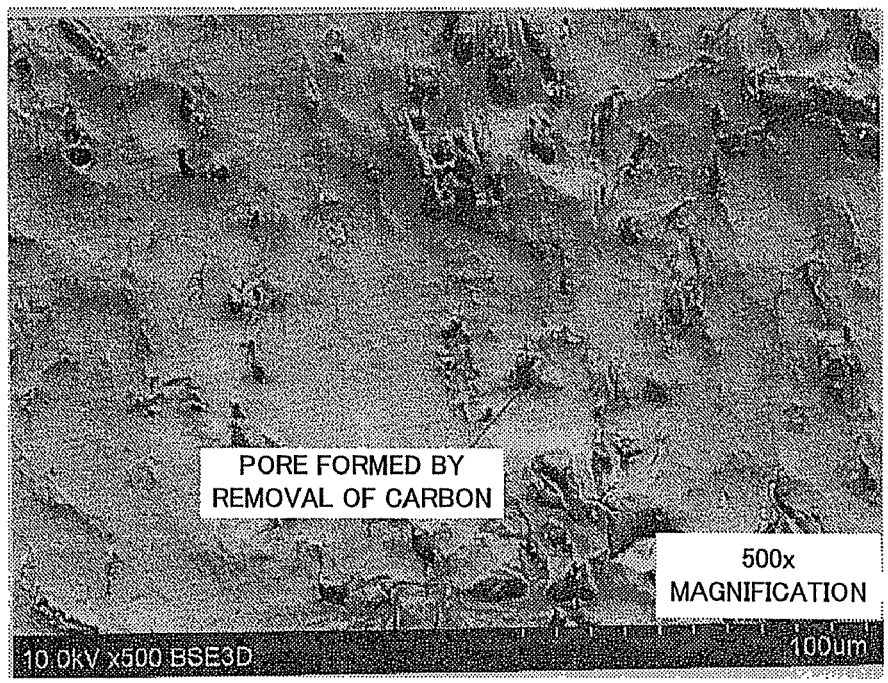
FIG. 9 is an enlarged microscopic photograph of section D of FIG. 6.

Hereinafter, an example will be described. In this example, PFA containing carbon fiber was prepared and tested to examine whether the carbon fiber contained in PFA could be removed as described in the above-mentioned embodiment. FIG. 3 is a photograph of a sample taken before an experiment relating to the example. FIG. 4 is a schematic block diagram of an experimental apparatus for treating the sample relating to the example. FIG. 5 is a photograph of the sample taken after the experiment relating to the example. FIG. 6 is a photograph of cross-section A-A of FIG. 5. FIG. 7 is an enlarged magnified microscopic photograph of portion B of FIG. 6. FIG. 8 is an enlarged microscopic photograph of portion C of FIG. 6. FIG. 9 is an enlarged microscopic photograph of portion D of FIG. 6.

(1) Sample

First, a sample of PFA containing carbon fiber was prepared. Ordinarily, PFA is translucent but the sample was black in color as shown in FIG. 3 because the carbon fiber was contained throughout PFA. This sample was cut into a predetermined piece and used for experiment.

(2) Experimental Apparatus

To carry out an experiment, an experimental apparatus 10 shown in FIG. 4 was used. The experimental apparatus 10 is mainly composed of a chamber 11 to treat a sample S, an ozone generator 12 to generate ozone, a water vapor generator 13 to generate water vapor, a valve 14 to control the flow rates of ozone and water vapor generated by ozone generator 12 and water vapor generator 13, respectively, a valve 15 to control the pressure inside the chamber 11, an ozone decomposer 16 to decompose ozone which is exhausted from the chamber 11, an exhaust system 17, and the like.

(3) Experimental Conditions

The sample S was introduced into the chamber 11, and the temperature and pressure were maintained at 105° C. and 75 KPa, respectively. Furthermore, ozone was generated by the ozone generator 12 and, at the same time, water vapor was generated by the water vapor generator 13. These were supplied to the chamber 11 by controlling with the valve 14 so that ozone becomes 9% by volume and water vapor flows at 4.5 cc/min. In addition, the time period during which ozone and steam were supplied was 30 hours.

(4) Experimental Results

As shown in FIG. 5 and FIG. 6, the surface portion of the sample was turbid white in color. This is thought to be because the carbon fiber in the surface portion of the sample was removed. On the other hand, the inner portion of the sample remained black as shown in FIG. 5. This is thought to be because the carbon fiber remains in the inner portion of the sample.

In addition, as shown in FIG. 7, it was confirmed that the carbon fiber remained in the inner portion of the sample (portion B). And, as shown in FIG. 8 and FIG. 9, it was confirmed that carbon fiber was removed from the surface portion of the sample (portion C and portion D).

From these results, it was confirmed that the carbon fiber in the sample could be removed by ozone and water vapor. In addition, since the removal of carbon fiber depends on the time of exposure to ozone and water vapor as mentioned above, it is believed that the carbon fiber remaining inside the sample could be completely removed if the time of exposure to ozone and water vapor were longer than that of the present example even for the sample size used in the present example.

The invention claimed is:

1. A method for manufacturing a porous member comprising:

providing a member formed of a fluororesin containing a carbon material and having a predetermined shape and exposing the member to an oxidizing gas to remove the carbon fiber contained in the member.

2. The method for manufacturing the porous member according to claim 1, wherein the carbon fiber is substantially removed from the member.

3. The method for manufacturing the porous member according to claim 1, wherein the fluororesin is tetrafluoroethylene/perfluoroalkylvinylether copolymer or polytetrafluoroethylene.

4. The method for manufacturing the porous member according to claim 1, wherein the oxidizing gas comprises ozone.

5. The method for manufacturing the porous member according to claim 4, wherein the oxidizing gas comprises water vapor.

* * * * *